United States Patent Office 3,442,312
Patented May 6, 1969

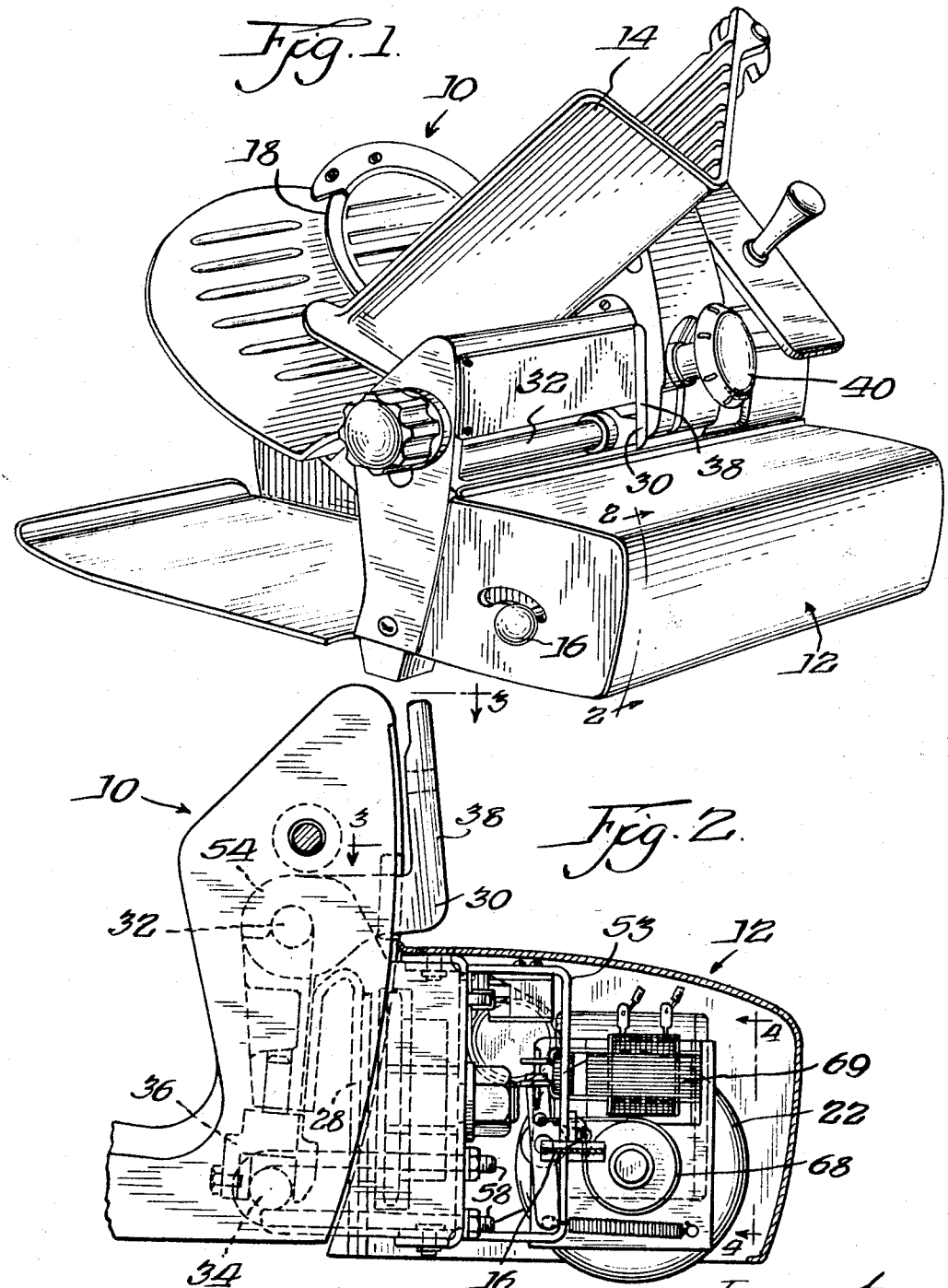

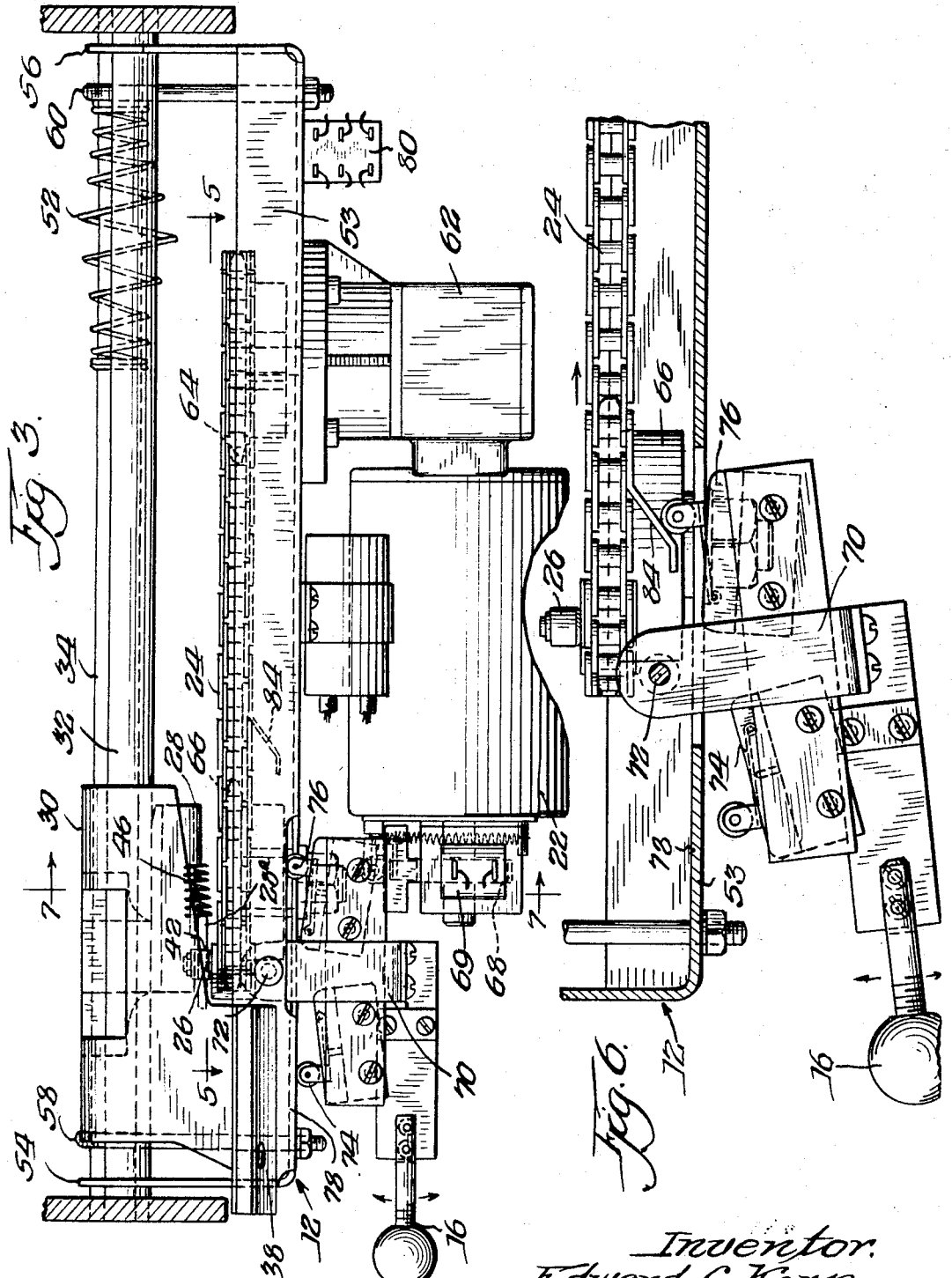

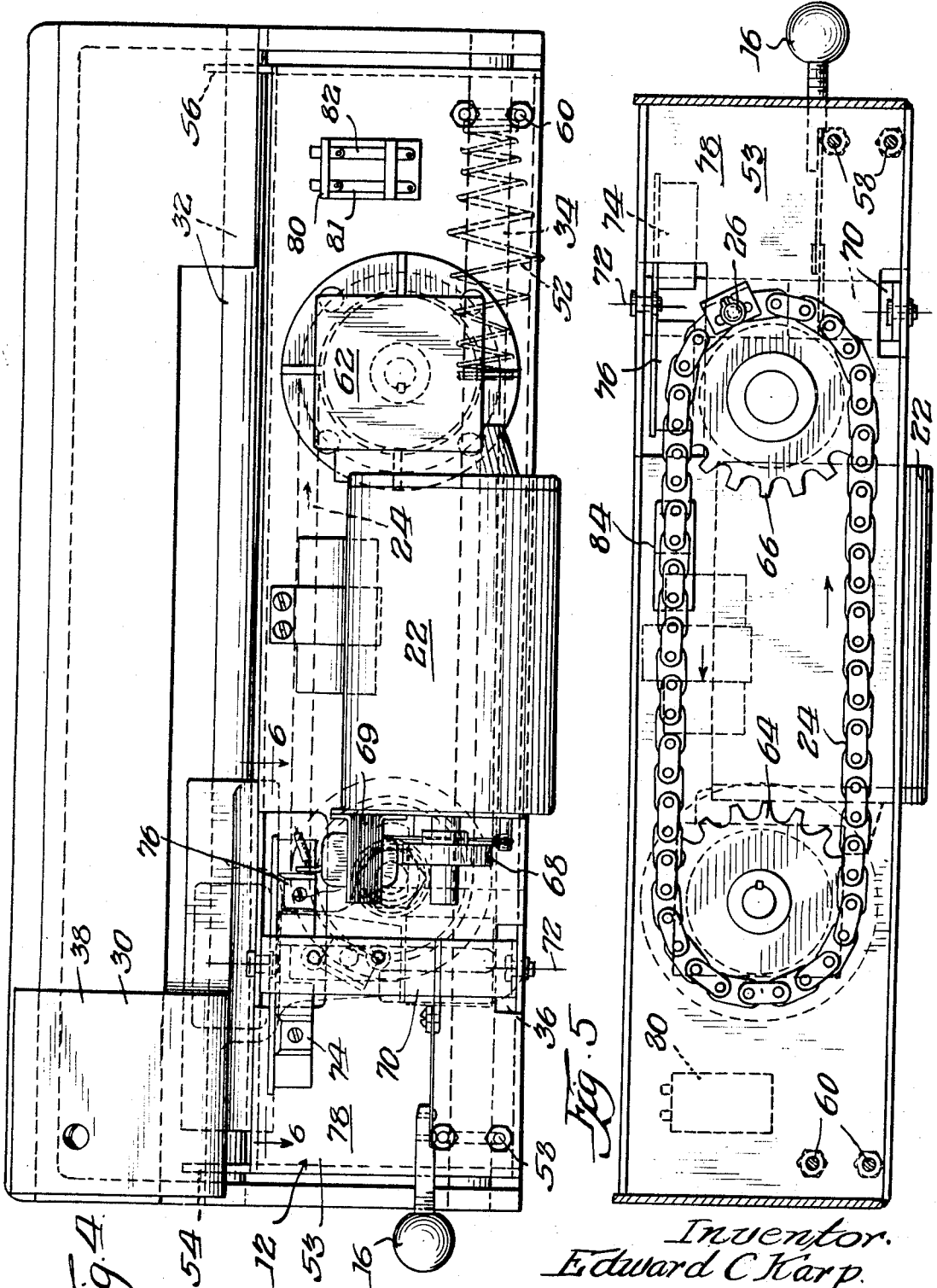

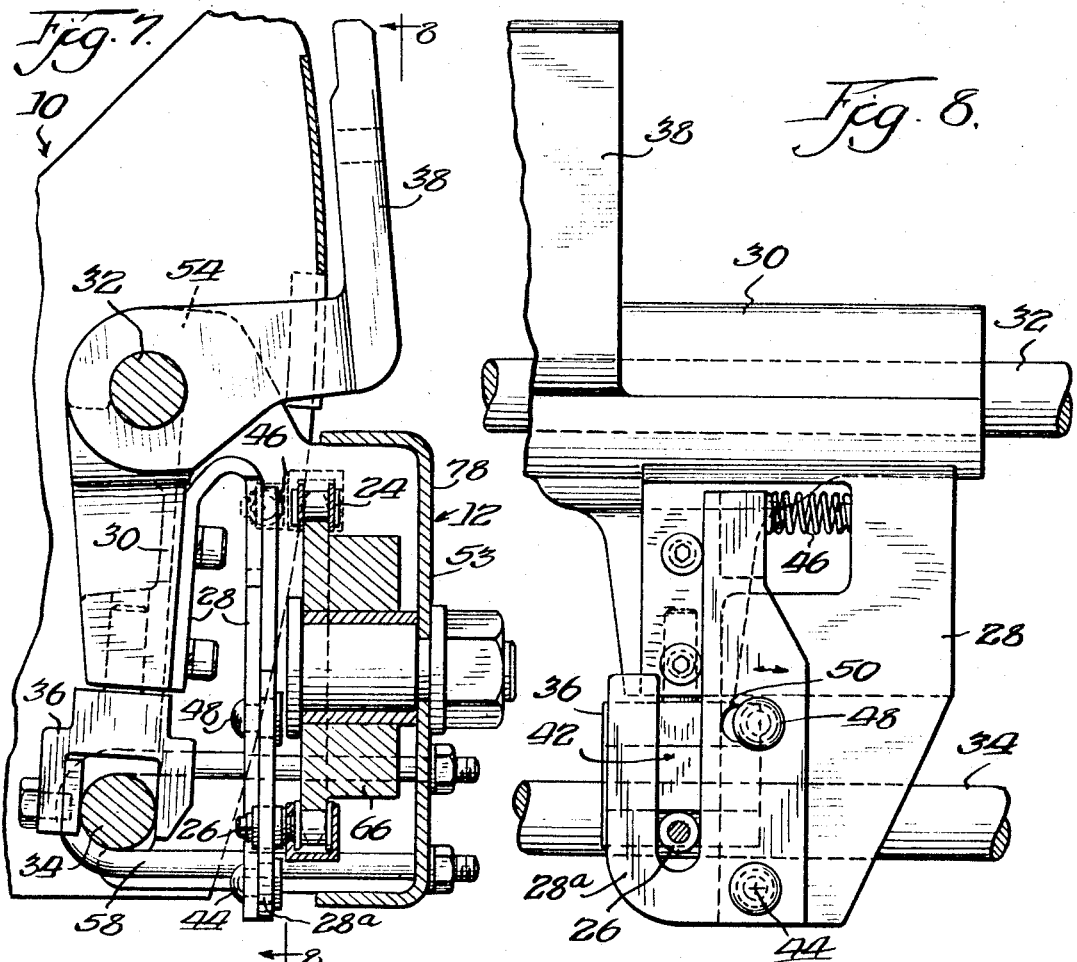
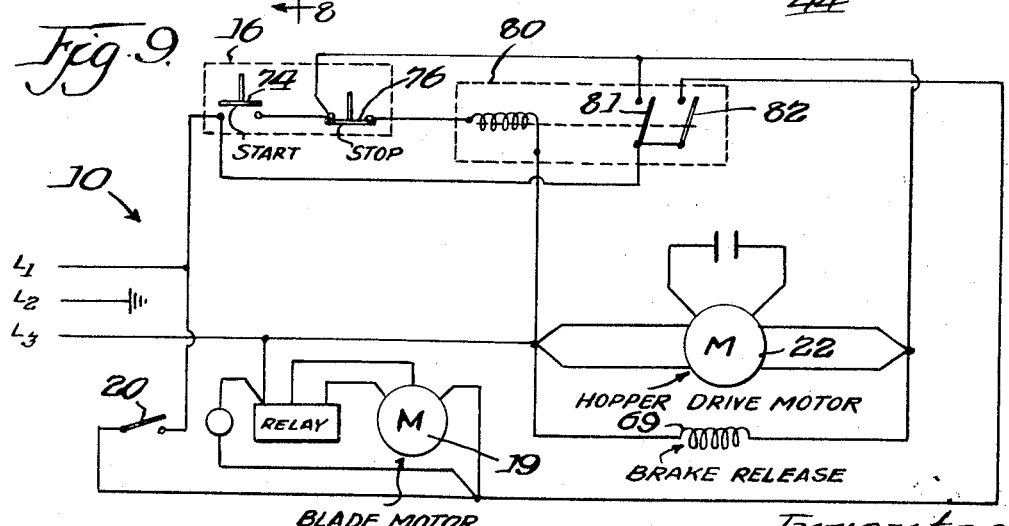

3,442,312
SLICER
Edward C. Karp, Belvidere, Ill., assignor to Sanitary Scale Company, Belvidere, Ill., a corporation of Illinois
Filed May 15, 1967, Ser. No. 638,470
Int. Cl. B23d *19/00, 45/18*
U.S. Cl. 146—102                                    10 Claims

ABSTRACT OF THE DISCLOSURE

A food slicing machine having a side mounted power module for automatically reciprocally driving the hopper. When the automatic hopper drive is stopped, the hopper stops automatically at its loading position and automatically disengages from its drive to provide free manual movement. Automatic drive may be reinitiated regardless of the position of the hopper.

Introduction

The present invention relates to food slicing machines in which the hopper may be selectably driven either automatically or manually. It is desirable in such a machine that the operator be able to easily switch between automatic reciprocal drive of the hopper and purely manual movement of the hopper. It is also desirable that the drive mechanism for the hopper be noncritical and foolproof as food slicing machines are frequently operated by relatively unskilled personnel in restaurants, food stores, etc. It is particularly desirable to provide a food slicing machine wherein the automatic or powered drive of the hopper automatically engages and disengages. Further, it is desirable that this disengagement and engagement be noncritical, i.e. be capable of operating regardless of the hopper position at the time the machine is switched between automatic and manual operation. A further desirable feature is that the automatic drive means be a separate integral unit which may be detachably mounted to a manual slicer without substantial modification of the slicer and without raising the effective working height of the slicer or increasing its required counter space.

The food slicing machine of the invention is capable of providing all of the above advantages. It includes drive means for automatically continuously reciprocally moving the hopper between a first and a second position past the slicing blade, the first position being a hopper loading position. The drive means is selectively startable and stoppable and may be a compact modular unit detachably mounted to one side of the food slicing machine. The machine includes stopping means for stopping the hopper at the first or loading position when the drive means is stopped. It also includes means providing automatic disengagement of the drive means from the hopper means when the drive means is stopped to enable the hopper means to be freely manually reciprocally movable.

Further objects, features and advantages of the invention pertain to the particular arrangement and structure whereby the above mentioned aspects of the invention are attained. The invention will be better understood by reference to the following description and to the drawings forming a part thereof, which are substantially to scale, wherein:

FIGURE 1 is a perspective view of an exemplary embodiment of a food slicing machine in accordance with the present invention;

FIGURE 2 is an end view of the embodiment of FIGURE 1 partially in cross-section along the plane 2—2 of FIGURE 1;

FIGURE 3 is a cross-sectional view taken along the plane 3—3 of FIGURE 2;

FIGURE 4 is a cross-sectional view taken along the plane 4—4 of FIGURE 2;

FIGURE 5 is a cross-sectional view taken along the plane 5—5 of FIGURE 3;

FIGURE 6 is a cross-sectional view taken along the plane 6—6 of FIGURE 4;

FIGURE 7 is a cross-sectional view taken along the plane 7—7 of FIGURE 3;

FIGURE 8 is a cross-sectional view taken along the plane 8—8 of FIGURE 7; and

FIGURE 9 is a schematic diagram of the electrical circuit of the embodiment of FIGURES 1 through 8.

Description of the exemplary embodiments

There is shown in FIGURES 1 through 9 a food slicing machine or slicer 10 in accordance with the present invention. The slicer 10 includes a drive module 12 detachably mounted to one side which automatically reciprocally drives a hopper 14. It will be appreciated that various of the components of the slicer 10, other than the drive module 12, are preferably conventional and accordingly need not be described herein. Suitable components are disclosed for example in the Model S4 manual slicer manufactured by the Sanitary Scale Company of Belvidere, Ill.

Briefly describing the basic operation of the slicer 10, it may be switched from off to fully automatic operation simply by moving a two position lever switch 16 on the drive module 12 from its off position to its on position. With the lever switch 16 in the off position, the machine may be operated in an identical manner to a conventional manual slicer, i.e. the hopper 14 is freely manually reciprocally movable, and, as may be seen from FIGURE 9, the slicing blade drive motor 19 may be conventionally operable by its regular separate switch 20.

With the lever switch 16 in the on position, the blade motor 19 and the hopper drive motor 22 in the drive module 12 are both automatically turned on. The hopper drive motor 22 continuously drives an endless chain 24 from which a driving stud 26 projects. The driving stud 26 engages a cam plate 28 fixed to the hopper mount 30. This provides a positive reciprocal drive of the hopper 14 between a first or loading position away from the slicing blade 18 and a second position past the slicing blade 18. When the switch lever 16 is switched from the automatic or on position back to the off position, the hopper drive motor 22 continues to run until the hopper 14 returns to its loading position, at which point the hopper motor is automatically stopped. In this position, the cam plate 28 is freely movable away from the driving stud 26, thereby providing automatic disengagement of the hopper from the hopper drive motor. The construction of the cam plate 28 is such that the hopper 14 may be left in any position with no resulting damage to the slicer 10 when automatic drive is reinitiated by operation of the lever switch 16.

Considering in detail the support of the hopper 14 by the hopper mount 30, it may be seen that the entire unit is supported by two parallel vertically spaced horizontal rods 32 and 34 respectively. As may be particularly seen from FIGURES 7 and 8, the hopper mount 30 slidably encloses the upper rod 32. The lower end of the hopper mount 30 has a U-shaped bracket 36 slidably partially enclosing the lower rod 34. The upper end of the hopper mount 30 provides an exposed mounting plate 38. As may be seen in FIGURE 1, the hopper 14 is mounted to the mounting plate 38 by a large knob 40.

Referring to FIGURES 7 and 8, it may be seen that the only unit mounted to the hopper mount 30 is the cam plate 28 through which the hopper 14 is driven. The cam plate 28 is here constructed as a folded and inverted U-shaped plate member having its rearward leg or plate fastened to the hopper mount 30. The cam plate 28 described herein is exemplary, and it will be appreciated that other constructions or projections providing a similar cam effect would be appropriate. The forward plate of the cam plate 28 projects away from the hopper mount 30 and is generally vertical. It contains a vertical cam slot 42 at the edge thereof facing the loading end of the machine. It may be seen that the cam slot 42 has a vertical length greater than the maximum vertical dimensions of the drive chain 24 and a width only slightly larger than the diameter of the driving stud 26. The cam slot 42 is thus adapted to contain and confine the driving stud 26 therein throughout the path of movement of the driving stud. However, the cam slot 42 is open in one quadrant, specifically the upper half of the cam slot 42 on the side facing the loading side of the slicer 10. The remaining or unopen surfaces of the cam slot which engage the driving stud 26 define an upright J-shaped configuration.

It may be seen that, in FIGURE 8, when the driving stud 26 is in the upper half of the cam slot 42, the cam plate may be driven by the driving stud 26 toward the slicer. However, it may also be seen that, if the driving stud 26 is stopped in this position, the hopper 14 is freely manually reciprocally movable away from the driving stud 26 as the one side of the cam slot 42 will be open.

It will be appreciated that the above description of the cam slot 42 is for a clockwise movement of the drive chain 24 and its driving stud 26. If the drive chain 24 were driven in the opposite direction, the preferred cam configuration would be that of an inverted rather than an upright J. To provide automatic disengagement between the drive motor and the cam plate, the driving stud 26 would be stopped in the lower half of the cam slot rather than in the upper half.

Preferably, resilient means are associated with the cam plate 28 to absorb the impact of the driving stud 26 thereagainst. Such impacts occur when the hopper drive motor 22 is started with the hopper in a position other than its loading position whereby the cam plate is out of contact with the driving stud 26. Merely by way of example, this may be provided by constructing the cam plate 28 in two parts with the actual cam surfaces on a separate cam member 28a which is pivotably mounted to the main front portion of the cam plate 28 by a rivet connection 44 at its lowermost extremity. The cam member 28a is freely pivotable about this rivet connection 44 against a strong coil spring 46 retained in compression between the upper end of the cam member 28a and the cam plate 28. An additional intermediate rivet 48, riding in an elongate aperture 50 in the cam member 28a, provides additional support for the cam member 28a. Under impact of the driving stud 26, the cam member 28a briefly yields resiliently against the spring 46 to absorb the impact.

To prevent the hopper 14 from overriding or moving out of engagement with the driving stud 26 at the extreme inner position of the hopper 14, a coil spring 52 is provided on the upper rod 32. The coil spring 52 engages and exerts a decelerating force on the hopper mount 30 at approximately the point at which the driving stud 26 begins to decelerate, thus insuring that the cam plate 28 remains in contact with the driving stud.

Considering in detail the drive module 12, the entire unit is preferably a modular power pack which may be attached to a new or existing manual slicer such as the Sanitary Scale Model S4 without modification of the slicer, except for the mounting of the cam plate 28 to the hopper mount 30. It may be seen that the drive module 12 mounts to one side of the slicer rather than being a base structure on which the slicer must be mounted. Thus, the working height of the slicer is not affected by the presence or absence of the drive module 12 and a special work table is not required. The drive module 12 need not extend any significant distance horizontally beyond the normal overhang of the hopper 14 thereby requiring little if any additional counter space. All of the components of the drive module 12 are here mounted to a single mounting plate 53.

Various means may be provided for detachably mounting the module 12 to the slicer 10. The particular attachment means disclosed here includes hooks 54 and 56 integral with the mounting plate 53, which hook over opposite ends of the upper rod 32. U-shaped bolts 58 and 60 then secure each end of the mounting plate 53 to the lower rod 34.

Considering the exemplary drive system disclosed herein, it may be seen that the capacitor start hopper drive motor 22 drives a right angle reduction gear 62. The output shaft of the gear 62 rotates a chain driving sprocket 64. The driving sprocket 64 rotates on a vertical plane and is located at the innermost or slicing position of the travel of the hopper 14. A corresponding idler sprocket 66 is located adjacent the outermost or loading position of the hopper 14, and the drive chain 24 is carried between the two sprockets 64 and 66. The upper and lower flights of the drive chain 24 are generally horizontal and coextensive in length with the desired reciprocal travel path of the hopper 14. The drive chain 24 has fixed thereto the driving stud 26 which provides a lateral horizontal cylindrical bearing projection from the drive chain 24.

To rapidly stop the driving stud 26 in its preferred stopping position, the hopper drive motor is provided with a spring loaded Prony brake 68. The Prony brake 68 is normally engaged and is released by a solenoid brake release 69. The brake release 69 is actuated whenever the hopper drive motor is actuated.

Considering the control over the operation of the drive module 12, it will be recalled that switching between automatic and manual operation is accomplished solely by operation of the lever switch 16 between its extreme positions. Referring to FIGURES 6 and 9 particularly, it may be seen that the lever switch 16 correspondingly rotates a U-shaped switch bracket 70 about a vertical axis 72. Mounted to the bracket 70 is a normally open start switch 74 projecting from one side of the axis 72 and a normally closed stop switch 76 projecting from the opposite side. It may be seen that when the lever switch 16 is moved to its inward position the start switch 74 is rotated into engagement with a wall 78 of the mounting plate 53 as in FIGURE 3. This closes the start switch 74 which, as may be seen from FIGURE 9, applies power to the hopper drive motor 22 and the solenoid brake release 69. Power is also thereby applied through the normally closed stop switch 76 to the coil of a starting relay 80 to close the starting relay's contacts 81 and 82. The closing of the contact 82 applies power to the blade motor 19, and thus both the hopper drive and the slicing blade are actuated by the single movement of the lever switch 16 to its automatic drive position.

Considering now the movement of the lever switch 16 from the automatic drive (on) position to the manual (off) position, it may be seen from FIGURE 6 that this movement rotates the start switch 74 away from engagement with the wall 78 and rotates the stop switch 76 through an opening in the wall 78 into a position adjacent the drive chain 24. Referring to FIGURE 9, it may be seen that the start switch 74 is not open, but that a current path is provided through the still closed contact 81 back through the stop switch 76 to continue actuating the coil of the relay 80. Thus, the hopper drive motor 22 and blade motor 19 remain on.

The hopper drive motor 22 and the blade motor 19 will continue to operate until the stop switch 76 is opened. This is accomplished by a switch tripper 84 fastened to the drive chain 24 as shown in FIGURE 6. The switch tripper 84 is an inclined plate projecting horizontally from the drive chain 24. The switch tripper 84 is positioned to contact the stop switch 76 when the stop switch is moved adjacent the drive chain 24 by the operation of the lever switch 16 to the off or manual position. The switch tripper 84 is spaced on the drive chain 24 from the driving stud 26 at a distance such that, when the switch tripper 84 engages the stop switch 76, the driving stud 26 is approaching its extreme outward position on the idler sprocket 66. The tripping open of the stop switch 76 interrupts the current to the coil of the starting relay 80 thereby opening the contacts 81 and 82 and hence interrupting the current to both the hopper drive motor 22, the brake release 69 and the blade motor 19. The drive motor 22 is braked so as to finally stop the stud 26 slightly above the midpoint of the cam slot 42, i.e. the driving stud 26 is positioned within the portion of the cam slot 42 that is open to allow automatic disengagement of the hopper 14 from the driving stud 26.

From the above, it may be seen that the operation of the single lever switch 16 effectively provides complete control over the selection of either the manual or fully automatic drive of the hopper 14. No separate external control or internal clutching is required for engagement or disengagement of the drive means. The hopper 14 will always stop at its loading position regardless of the time at which the lever switch 16 is moved to the manual position. This is accomplished within less than one reciprocal movement of the hopper.

All of the above described components of the drive module 12 may be of a simple, rugged and noncritical construction and of conventional materials. The entire unit is rugged and maintainance free. No critical adjustment or replacement of clutch elements are required. The machine cannot be jammed or damaged by any improper sequence of operation of the operating switches or by mispositioning of the hopper. It will be appreciated of course that additional switching means may be provided to prevent the automatic drive mechanism from starting unless the hopper is in the start or loading position.

It may be seen that there has been described herein an improved food slicing machine having numerous advantages in both its structure and operation. The apparatus described herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In a food slicing machine having hopper means reciprocally movable between a first and a second position past a slicing blade, said first position being a hopper loading position, the improvement comprising:
    drive means for automatically continuously reciprocally moving said hopper means when engaged therewith, said drive means being selectively startable and stoppable,
    stopping means for stopping said hopper means at said first position when said drive means is stopped,
    and disengaging means for automatically disengaging said drive means from said hopper means when said drive means is stopped,
    said hopper means being freely manually reciprocally movable when disengaged from said drive means.

2. The food slicing machine of claim 1 wherein said drive means is a compact modular unit detachably mounted to one side of said food slicing machine.

3. The food slicing machine of claim 1 wherein said stopping means includes switching means operative in response to the position of said hopper means, said switching means being operably connected to said drive means.

4. The slicing machine of claim 1 wherein said disengaging means includes mechanical coupling means between said drive means and said hopper means, which automatically disengages said drive means from said hopper means in said first position.

5. The slicing machine of claim 4 wherein said mechanical coupling means includes a projecting drive member moved by said drive means and a cam fastened to said hopper means, said cam engaging and being moved by said drive member, and at least one-half of one side of said cam being open to allow manual movement of said hopper means away from said drive member when said drive member is adjacent said open side of said cam.

6. The slicing machine of claim 4 wherein said mechanical coupling means includes a projecting drive member driven by said drive means in an elongated path generally parallel the direction of movement of said hopper means and a driven cam fastened to said hopper means, said cam having a vertically elongated slot normally confining said drive members therein, said slot being open in one quadrant to allow manual movement of said hopper means away from said drive member when said drive member is adjacent said open quadrant, said drive member being adjacent said open quadrant when said hopper means is in said first position.

7. The slicing machine of claim 4 wherein said mechanical coupling means automatically engages said driving means with said hopper means at any position of said hopper means after said drive means is started.

8. The slicing machine of claim 6 wherein said stopping means includes switching means controlling said drive means, and switch actuating means moving with said drive member engaging said switching means when said hopper means is in said first position.

9. The slicing machine of claim 8 wherein said drive means includes a motor driven endless chain moving in an elongate path extending parallel the direction of movement of said hopper means and in a vertical plane, said chain carrying said drive member and said switch actuating means projecting horizontally therefrom.

10. The slicing machine of claim 9 further including resilient means for cushioning said hopper means from sudden changes in velocity.

References Cited
UNITED STATES PATENTS

| | | | |
|---|---|---|---|
| 2,431,391 | 11/1947 | Folk | 146—102 |
| 2,740,442 | 4/1956 | Lundell | 146—102 |
| 3,051,207 | 8/1962 | Hartley | 146—102 |

JAMES M. MEISTER, *Primary Examiner.*